United States Patent
Ohkawa

(10) Patent No.: US 7,410,285 B2
(45) Date of Patent: Aug. 12, 2008

(54) SURFACE LIGHT SOURCE DEVICE

(75) Inventor: Shingo Ohkawa, Misato (JP)

(73) Assignee: Enplas Corporation, Kawaguchi (JP)

( * ) Notice: Subject to any disclaimer, the term of this patent is extended or adjusted under 35 U.S.C. 154(b) by 0 days.

(21) Appl. No.: 10/983,588

(22) Filed: Nov. 9, 2004

(65) Prior Publication Data
US 2005/0141241 A1 Jun. 30, 2005

(30) Foreign Application Priority Data
Nov. 11, 2003 (JP) ............................. 2003-380767

(51) Int. Cl.
*F21V 7/04* (2006.01)
(52) U.S. Cl. .................. 362/612; 362/611; 362/634
(58) Field of Classification Search ............. 362/600, 362/612, 611, 615, 614, 620, 626, 632, 633, 362/634
See application file for complete search history.

(56) References Cited

U.S. PATENT DOCUMENTS

| | | | | |
|---|---|---|---|---|
| 4,729,068 A | * | 3/1988 | Ohe | 362/615 |
| 4,870,484 A | * | 9/1989 | Sonehara | 348/791 |
| 5,027,258 A | * | 6/1991 | Schoniger et al. | 362/629 |
| 5,271,077 A | * | 12/1993 | Brockman et al. | 385/31 |
| 5,550,676 A | * | 8/1996 | Ohe et al. | 359/599 |
| 5,743,616 A | * | 4/1998 | Giuliano et al. | 362/612 |
| 6,164,789 A | * | 12/2000 | Unger et al. | 362/610 |
| 6,259,854 B1 | * | 7/2001 | Shinji et al. | 385/146 |
| 6,784,603 B2 | * | 8/2004 | Pelka et al. | 313/113 |
| 2003/0117793 A1 | * | 6/2003 | Shin et al. | 362/31 |
| 2004/0042233 A1 | * | 3/2004 | Suzuki et al. | 362/561 |
| 2004/0125586 A1 | * | 7/2004 | Ho | 362/27 |
| 2004/0130912 A1 | * | 7/2004 | Miyashita | 362/561 |
| 2005/0024844 A1 | * | 2/2005 | Oh | 362/31 |
| 2005/0146894 A1 | * | 7/2005 | Keuper | 362/605 |

FOREIGN PATENT DOCUMENTS

JP 10-293202 11/1998
JP 2004-200093 * 12/2002

* cited by examiner

*Primary Examiner*—Jacob Choi
(74) *Attorney, Agent, or Firm*—Staas & Halsey LLP

(57) ABSTRACT

A surface light source device is provided with a primary light source and light guide plate. The light guide plate has an incidence side face opposite to which the primary light source employing LEDs or the like is disposed, an emission face for emitting light, which has been incident to the incidence side face, during the propagation process, and a back face oppositely located with respect to the emission face. The back face may be provided with a plurality of prism projections running generally vertically to the incidence side face. The primary light source has an effective light emitting surface provided with length L in a thickness direction of the light guide plate, which is not smaller than thickness t of the light guide plate at the incidence side face. This causes primary light to be incident to the incidence side face as to cover from an upper edge to lower edge thereof, preventing dark parts from being generated. As a result, the emission face comes to avoid stripe-like uneven brightness from appearing thereon.

9 Claims, 3 Drawing Sheets

SURFACE LIGHT SOURCE DEVICE

BACKGROUND

1. Field of Invention

The present invention relates to a surface light source device which is applicable to backlighting for liquid crystal display and other various devices for illumination or display.

2. Related Art

A known liquid crystal display has a liquid crystal display panel on the back side of which a surface light source device is disposed for backlighting. The surface light source device is provided with a light guide plate having a size and plane shape the same as those of the liquid crystal display panel, a primary light source disposed beside the light guide plate and a reflection plate disposed on the back side of the light guide plate, being called surface light source device of side light type.

Demand for thin-structured liquid crystal displays has been growing recent years. This brings a tendency that surface light source devices employ thin light guide plates. Such a tendency requires small light emitting sources. Small-sized light emitting sources (primary light sources) are used for supplying light to thin light guide plates. Light emitting diode (LED) is a typical small light source. FIGS. 4 and 5 illustrate surface light source device 100 employing LEDs 101 as light emitting source (primary light source) 101 in accordance with a prior art. LEDs 101 are disposed at a side face of light guide plate 102. Each LED denoted by reference numeral 101 is package-type LED, including a light emitting portion (light emitting element) 103.

Each light emitting portion (light emitting element) 103 is resin-sealed by resin package 104 so that light radiating face 103A is exposed from resin package 104. As shown in FIG. 4, the thickness of LED 101 including package 104 is set to that of light guide plate 102 at the side face (incidence side face) opposite to LED 101 for the sake of convenience in assembling. Accordingly, the length of light radiating face 103A along light guide plate thickness is smaller than the thickness of light guide plate 102 at the incidence side face.

Another prior art is disclosed in Tokkai-Hei 10-293202 (pp. 3 to 4, FIG. 1), also showing that the length of a light radiating face along light guide plate thickness is shorter than the thickness of a light guide plate in the vicinity of an incidence side face. Such light guide plates are subject to unevenness in brightness that appears on an emission face in the vicinity of an incidence side face. According to the above prior art, a plurality of grooves giving incident light diversified travelling directions are formed on the incidence side face for preventing this.

However, the brightness unevenness preventing art is apt to fail to reduce enough unevenness in brightness because LED is disposed so that its light radiating face is in contact with (or very close to) an incidence side face of an light guide plate. This situation is illustrated exemplarily in FIGS. 4 and 5.

There are upper and lower areas 105A, 105B on which light radiating face 103A does not abut since light radiation face 103A can not cover the thickness of light guide plate 102 at incidence side face 105 as described above. Primary light is not incident to areas 105A and 15B, providing a shade source which generates dark band 106 in light guide plate 102. This dark band 106 causes emission face 102A of light guide plate 102 to have stripe-like uneven brightness, which is observed as shown in FIG. 5. In other words, illumination light has a reduced quality.

A known light guide plate has a generally rectangular emission face (a major face) and a generally wedge-shaped cross section, being used frequently. The light guide plate has a back face (another major face opposite to the emission face) which is inclined as to get closer according to an increasing distance from an incidence side face. It is also known to form a plurality of prism projections running vertically to the incidence side face on the back face.

If such a light guide plate is used with a LED disposed as described above, incident light is reflected toward the emission face, after entering within the light guide plate, in a manner such that the light gets a restricted angular extension due to being effected by the prism projections formed on the back face. As a result, the foresaid dark band is not expanded, being seen clearly on the emission face. This tends to bring a conspicuous stripe-like uneven brightness.

As described above, a liquid crystal display employing surface light source device 100 involving dark band 106 is hardly able to provide a high-quality image on a liquid crystal display panel.

OBJECT AND SUMMARY OF INVENTION

An object of the present invention is to provide a surface light source device overcoming the above problem. In other words, the present invention provide a surface light source device that gives a uniformalized distribution to the propagating light within the light guide plate and is able to have a reduce stripe-like unevenness in brightness.

A surface light source device in accordance with the present invention is provided with a primary light source having an effective light emitting surface radiates primary light and a light guide plate that is supplied with said primary light, said light guide plate having an incidence side face opposite to which said light source is disposed, an emission face for emitting light, which has been incident to said incidence side face, during a propagation process, and a back face oppositely located with respect to said emission face.

And said effective light emitting surface is provided with a length in a thickness direction of said light guide plate, which is not smaller than thickness t of said light guide plate at said incidence side face.

This condition on relation between size of effective light emitting surface of the primary light source and that of incidence side face of the light guide plate is a specifically important feature. This feature causes the propagating light within the light guide plate to have a uniformalized distribution, preventing stripe-like unevenness in brightness from appearing on the emission face and providing a high-quality illumination light. This brightness unevenness preventing effect is performed even when prism projections are formed on the back face of an employed light guide plate, realizing a high-quality and highly bright illumination.

EMBODIMENT

Figure 1:
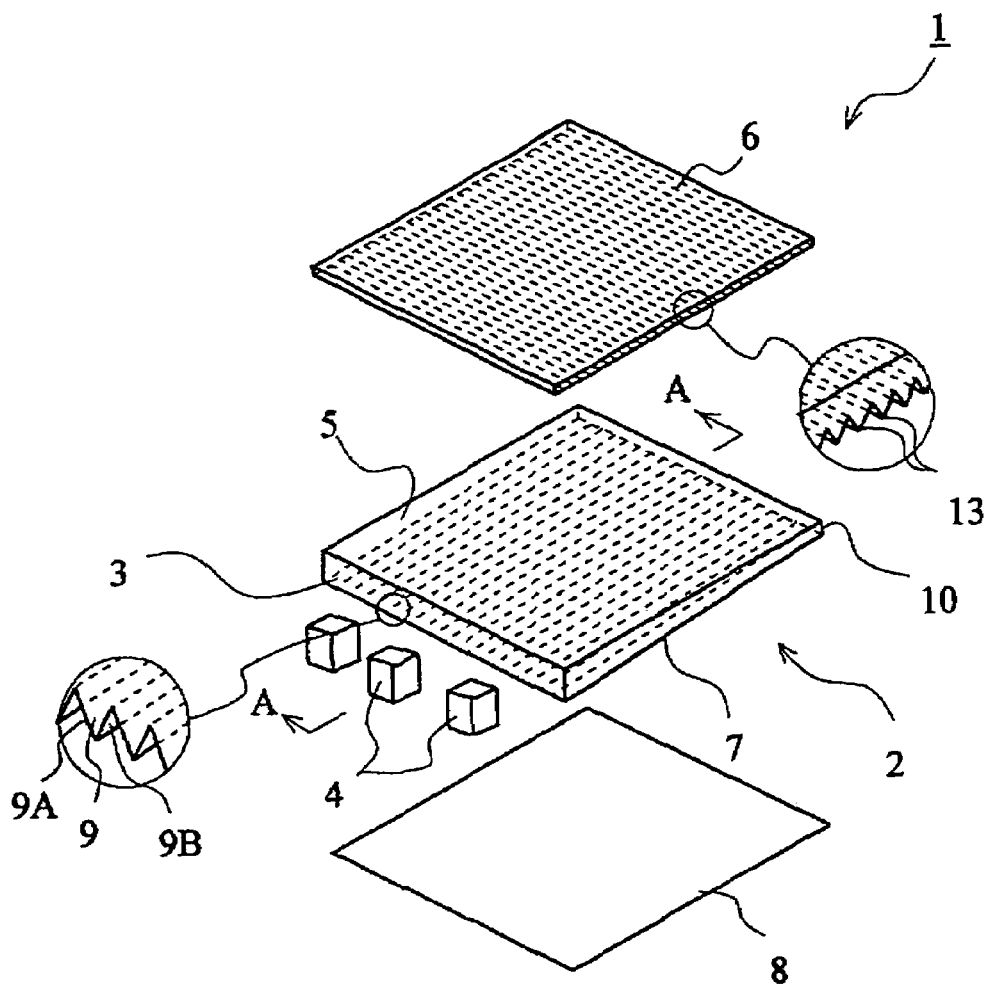
FIG. 1 is an exploded perspective view illustrating a surface light source device of an embodiment in accordance with the present invention.
Figure 2:
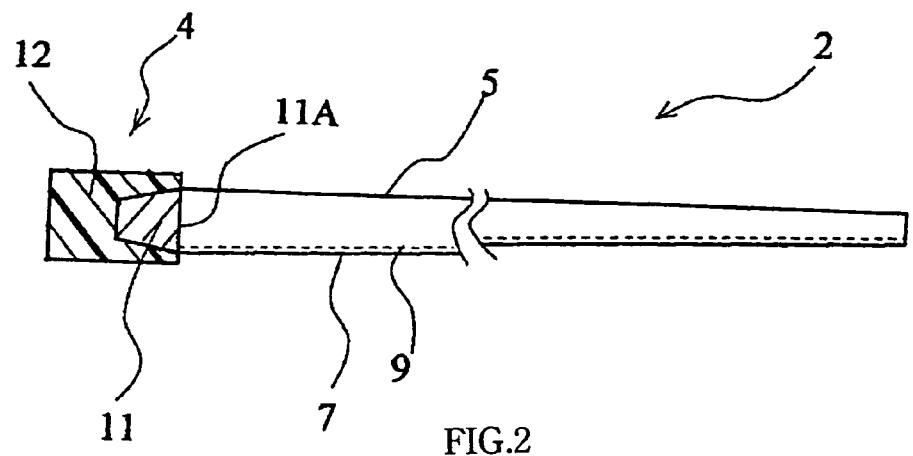
FIG. 2 is a cross section view along line A-A shown in FIG. 1.
Figure 3:
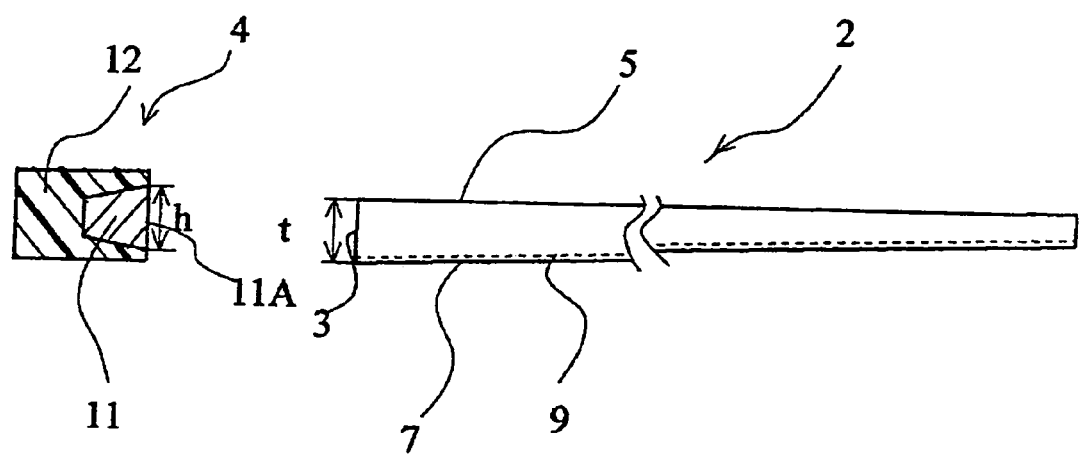
FIG. 3 is a diagram illustrating a state in which a LED keeps distance from the guide plate in a cross section along line A-A.

Described below is an embodiment in accordance with the present invention, referring to the drawings. LEDs are employed as primary light source in the embodiment, which puts no limit on the present invention. FIGS. 1 to 3 illustrate a surface light source device of an embodiment in accordance with the present invention. FIG. 1 is an exploded perspective view of the surface light source device. FIG. 2 is a cross section view of a light guide plate along line A-A shown in FIG. 1. FIG. 3 is also a cross section view along line A-A shown in FIG. 1, illustrating a state in which a LED keeps distance from the guide plate.

(Structure of Surface Light Source Device)

Referring to FIG. 1, surface light source device 1 is provided with light guide plate 2, a plurality of (three, as an example) LEDs 4 disposed oppositely to incidence side face 3 of light guide plate 2, prism sheet 6 disposed as a light control member on the side of emission face 5 of light guide plate 2 and reflection member (reflection sheet) 8 disposed on back face (a face opposite to emission face 5) 7 of light guide plate 2. Light guide plate 2 is made of a light permeable material such as polycarbonate (PC), polymethyl methacrylate (PMMA) or cycloolefin-type resin.

The shape of emission face 5 (i.e. plane shape of light guide plate 2) is generally rectangular. The thickness of light guide plate 2 gets thinner according to an increasing distance from incidence side face 3, giving light guide plate 2 a wedge-like cross section. In other words, back face 7 is inclined as to get closer to emission face 5 according to an increasing distance from LEDs 4. It is noted that the thickness of light guide plate 2 at incidence side face 3 is denoted by t as shown in FIG.3.

A plurality of prism projections 9 are formed on back face 7 of light guide plate 2, running generally vertically to incidence side face 5 (i.e. in a direction toward top end face 10 from incidence side face 3). Prism projections 9 are formed as to give a successively repeating configuration in a direction along incidence side face 3.

As shown in FIG. 1, prism projections 9 has a shape which is generally triangular in a plane parallel to incidence side face 3. Slopes 9A, 9B extend from a vertex of the triangular shape as to get further from each other according to an increasing distance from the vertex, functioning as light condensing function faces.

That is, a great part of the light travelling within light guide plate 2 is reflected by slopes (light condensing function faces) 9A, 9B as to be gathered around a normal direction with respect to emission face 5 in an imaginary plane parallel to incidence side face 3. Some light leaks through back face 7, being returned into light guide plate 2 by being reflected at reflection member (reflection sheet) 8 for the most part.

Entering into light guide plate 2, light travels towards top face 10 while involving repeated reflections at emission face 5 and back face 7, providing light emission from emission face 5 little by little on the process.

The light reflected at back face 7 is gathered around the normal direction with respect to emission face 5 in a plane parallel to incidence side face 3 by prism projections 9, being helped to be emitted from emission face 5. As a result, the light inner-incident to emission face 5 after being reflected at back face 7 (prism projections 9) has a high directivity and gives emission face 5 a heightened brightness.

As shown in FIGS. 2 and 3, LED 4 as a small light source has a packaged-structure molded by resin 12 so that light radiating face 11A of light emitting element (light emitting portion) 11 is exposed. LED 4 is disposed so that light radiating face 11A is directed to incidence side face 3. The length of light radiating face 11A in a direction of thickness of light guide plate 2 is denoted by symbol h.

In this embodiment, h is equal to thickness t of light guide plate 2 at incidence side face 3. This is merely an example in accordance with the present invention and may be h>t alternatively. LED 4 is set in assembling so that exposed light radiation face 11A abuts on and corresponds to incidence side face 3 as shown in FIG. 2. As a result, incidence side face 3 is covered from an upper edge to lower edge thereof along a thickness direction of light guide plate 2 by light radiating face 11A abutting thereto.

Prism sheet 6 is a known light control member made of light permeable plastic material (such as PET, PMMA or PC), being plane-shaped generally the same as emission face 5. Prism sheet 6 is provided with a great number of fine prism projections 13 running vertically to prism projections 9 on a face opposite to emission face 5. Prism projections 13 is shaped generally triangular, functioning-as to deflect light emitted from light guide plate 2 toward directions around a normal direction with respect to emission face 5 in an imaginary plane perpendicular to incidence side face 3. As a result, an object to be illuminated such as liquid crystal display panel is illuminated effectively.

Reflection member 8 is a piece of PET sheet made of PET mixed with white pigment to be made like sheet, a piece of film on which light-reflective metal such as aluminum is applied by vapor deposition or the like, being shaped approximately the same as generally rectangular back face 7 of light guide plate 2. As described previously, reflection member 8 functions as to reflect and return light emitted through back face 7 into light guide plate 2. It is noted that reflection member 8 may be replaced by a highly reflective surface formed on an inner face of a housing (not shown) in which light guide plate 2 is put.

Figure 4:
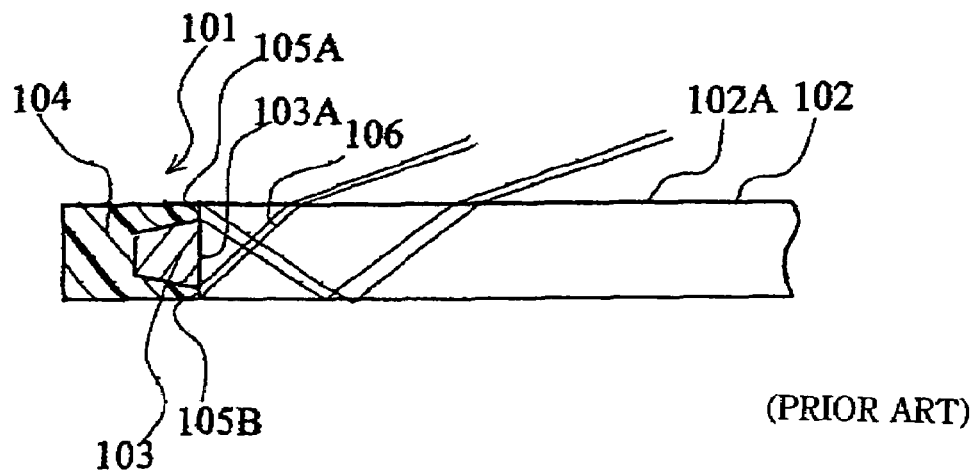
FIG. 4 is a cross section view of a surface light source device in accordance with a prior art; and, FIG. 5 is a plan view of the light source device shown in FIG. 4.
Figure 5:
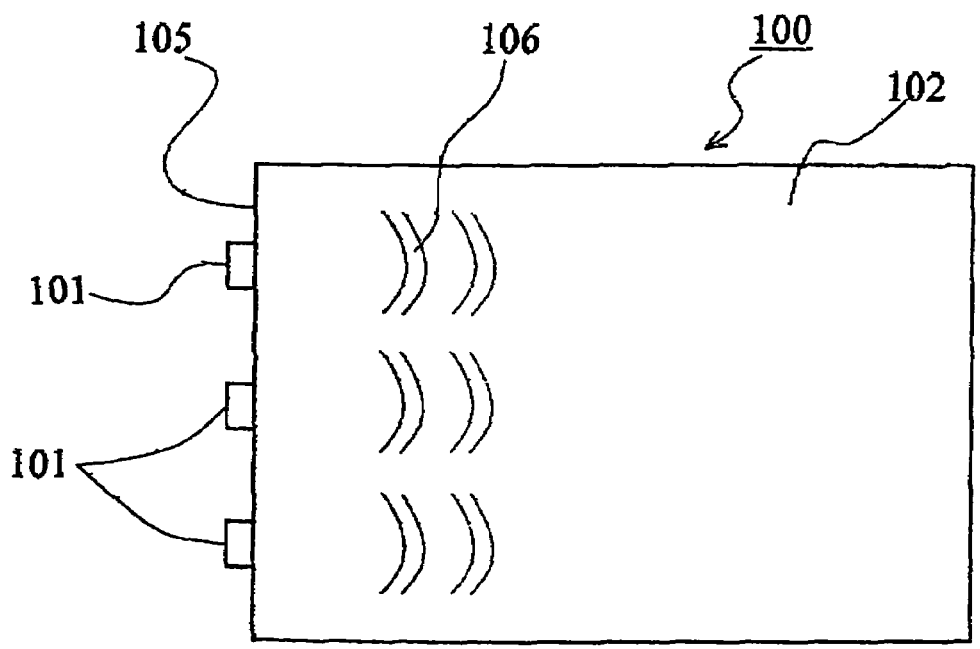

Turning on LED 4, light (primary light) is emitted from the whole of light radiation face 11A. Since light radiation face 11A abuts (or faces closely to) incidence side face 3 from the upper edge thereof, light impinges on incidence side face 3 so as to cover from the upper edge to the tower edge thereof. In other words, there is no primary-light-non-incident area like foresaid areas 105A, 105B (please see FIG.4). Accordingly, no dark portion is generated and emission face 5 is free from stripe-like brightness unevenness.

The light introduced into light guide plate 2 through incidence side face 3 is reflected by slopes 9A, 9B forming prism projections 9 on back face 7 as to be gathered around the normal direction with respect to emission face 5. This helps emission brightness to increase. Besides, prism projections 9 do not promote emergence of stripe-like unevenness on emission face 5 because no dark portion is generated in the light introduced through incidence side face 3.

The embodiment described above does not limit the scope of the present invention. Various modifications are allowed.

For example, the length of light radiating face 11A of LED 4 "h" may be greater than the thickness "t" of light guide plate 2 at incidence side face 3, namely, h>t as described previously. Such a modification allows incidence side face 3 to be covered from the upper edge to the lower edge thereof by incidence of light, thereby also generating no dark portion and preventing emission face 5 from having unevenness in brightness.

What is claimed is:

1. A surface light source device comprising:
   a primary light source having a planar light emitting surface; and
   a light guide plate, said light guide plate having a planar incidence side face opposite to which said planar light emitting surface of said primary light source is disposed such that said planar light emitting surface abuts said planar incidence side face, an emission face for emitting light incident upon said incidence side face, and a back face oppositely located with respect to said emission face, said planar light emitting surface of said primary light source having a light emitting surface length which is greater than a thickness of said light guide plate at every position of said incidence side face, and said back face including a plurality of prism projections running generally vertically to said incidence side face.

2. The surface light source device of claim 1, wherein the plurality of prism projections are generally triangular in shape.

3. The surface light source device of claim 1, wherein the plurality of prism projections are generally triangular in shape and are formed in a successively repeating configuration in a direction along the incidence side face.

4. The surface light source device of claim 1, wherein the light guide plate is wedge shaped.

5. The surface light source device of claim 1, wherein the light guide plate is wedge shaped having a thickness that decreases as a distance from the incidence side face increases.

6. The surface light source device of claim 1, further comprising a prism sheet disposed as a light control member on a surface of said emission face.

7. The surface light source device of claim 6, wherein said prism sheet comprises a plurality of substantially triangular prism projections.

8. The surface light source device of claim 7, wherein said plurality of substantially triangular prism projections extend vertically toward said plurality of prism projections of said back face.

9. The surface light source device of claim 6, further comprising a reflection member having a highly reflective surface formed on an inner face of a housing.

* * * * *